UNITED STATES PATENT OFFICE 1,989,383

METHOD OF TREATING SEAFOOD AND THE PRODUCT RESULTING THEREFROM

Charles H. Schuh, Glendale, Long Island, N. Y., assignor to Sturmack Company, Inc., Brooklyn, N. Y., a corporation of Delaware No Drawing. Application August 27, 1931, Serial No. 559,775. Renewed June 16, 1934

9 Claims. (Cl. 99—11)

The present invention relates to a method of treating seafood and to the product resulting threfrom and more particularly to a method of treating seafood to produce a baked and smoked steak and to a baked and smoked seafood steak produced by said method.

It is well known that when fish is boned and converted to the fillet condition, a product is obtained which has a watery consistency and which tends to lose a portion of its juices as soon as it is compressed or processed in some manner. The art has been in want of a steak or shaped unit of seafood which is edible and ready for consumption and which can be sliced and handled, and merchandised like delicatessen products such as bacon or sturgeon. Various proposals have been made to produce an edible and sliceable steak of seafood. Thus, attempts to make such steaks by shredding and compressing a seafood or by shredding, compressing and processing under heat or filleting, compressing, heating and cooling under pressure, etc., have resulted in the loss of juices, in the production of units having unsatisfactory consistency for slicing and have resulted in the production of finished units having an unpalatable taste. As far as I am aware, the art has not been provided with merchantable and consumable units or steaks of fish or seafood, and has not been provided with a satisfactory and practical method of treating seafood or fish to form units or steaks.

I have discovered that steaks of seafood or fish which are merchantable, consumable, sliceable, and handleable can be produced, and that the objections and difficulties noted hereinabove with respect to prior methods can be avoided.

It is an object of the invention to provide a method of producing steaks of seafood or fish which are baked and are ready for consumption and which are capable of being cut or sliced like cooked and prepared sturgeon.

It is another object of the invention to provide a steak of seafood which is nutritious, palatable and which contains a relatively high percentage of protein.

It is still another object of the invention to provide a method of producing steaks of seafood or fish in relatively simple, economical and thoroughly practical manner.

Other objects and advantages of the invention will become apparent from the following description of a preferred embodiment of the present invention.

Generally speaking, I first fillet the fish in the usual manner. To the fillet fish or watery fish mass, I add sufficient material having a high protein content to cause the formation of a jelly-like product. The jelly-like product is packed into a suitable mold without the loss of any drippage. The fish in the mold is baked and a baked fish steak is produced without the loss of juices. The baked steak of seafood is smoked under the influence of heat. The smoked steak can be handled and sold as a unit, can be cut or sliced, and can be eaten directly as a foodstuff. For a better understanding of the invention, by those skilled in the art, and for illustrative purposes, the following specific examples are given.

*Example No. 1*

Seafood or fish such as mackerel is boned in order to put the same into a fillet condition. By fillet condition is meant, fish in a skinned and boned condition together with any shreds which are produced. To the fillet fish or watery fish mass, I add sufficient material containing a high protein content to cause the jellying thereof. In practice, I have found that the addition of shrimp which contains about 25.4% of protein is suitable as the protein-containing material. I have found that about 50 parts of fillet mackerel and 50 parts of shredded shrimp when thoroughly mixed together will form a jelly-like product. This product contains practically all of the liquid or drippage which was produced in the foregoing operation. If desired, seasoning can be added to the mixture while undergoing the mixing operation. For instance, salt, spice, and the like, may be added to season the seafood to the desired taste.

The jelly-like mass of seafood or fish is packed into an aluminum mold having a suitable shape. The fish is baked at suitable temperatures, such as about 100° C. to about 150° C. for a period of time sufficient to bake the fish. In practice, about one-quarter of an hour to about one hour is sufficient time. The exact duration of time, of course, will vary depending upon the size and shape of the steak of fish.

The baked steak is placed in a cheese-cloth bag and is hung up in a smoke house. During the smoking operation, heat gradually applied until a maximum temperature of say about 110° C. to about 130° C. is attained at about the middle of the operation and the temperature is again reduced.

After the steak has been smoked, it can be handled and wrapped as a unit in any suitable manner. For instance, it can be wrapped in cellophane and can be shipped and sold in stores such as butcher shops, delicatessen stores, grocery stores, and the like. The smoked steak of seafood is palatable and is capable of being sliced. Thus a consumer can cut the finished smoked steak into slices and can directly consume the sliced seafood steak without any further treatment.

Example No. 2

Mackerel and cod are boned to put them in a fillet condition. I prefer to take about 60 parts of fillet mackerel and mix it thoroughly with about 40 parts of fillet cod. By adding protein-containing material with a high protein content, such as the white of an egg, to the mixture of mackerel and cod, a jelly-like product can be produced. In practice, I have found that the white of one egg is sufficient to cause the jellying of about one pound to about two pounds of fillet and shredded fish mixture. The white of the egg, of course, is thoroughly mixed in the fish mixture. The jelly-like product takes up practically all of the liquid or drippage produced in the foregoing operation.

The jelly-like mass is packed into an aluminum mold of suitable shape and is then baked as described in Example No. 1. For instance, the steak can be baked at a temperature of about 100° C. to about 150° C. for about one-quarter of an hour to about one hour. Following this baking operation, the baked fish is smoked in the same manner as described in Example No. 1.

When the fish has been thoroughly smoked, it can be wrapped in cellophane, or the like, and is ready for shipment and consumption. In the smoked condition the fish can be cut and sliced in a manner quite similar to the cutting and slicing of sturgeon.

Example No. 3

About 50 parts of shredded crab and about 50 parts of shredded shrimp are mixed together. To this mixture, and any drippage associated therewith, the white of egg is added in sufficient amount to effect jellying of the fish mixture. In practice, the white of one egg to every two pounds of fish has been found to be sufficient. The fish mixture can be seasoned with salt, spices and the like. The seasoned and jelly-like fish mass is packed into aluminum molds. The fish, as mentioned hereinabove, is baked at suitable temperatures such as about 100° C. to about 150° C. for about one-quarter of an hour to about one hour. Following baking, the product is smoked as described in Example No. 1. The smoked product is ready for consumption or for wrapping and shipping as mentioned in connection with Examples 1 and 2.

Example No. 4

Mackerel is boned and converted to a fillet condition. To the shredded mackerel a protein-containing material with a high protein content is added, such as scallops which contain about 14.7% of protein. With this fish mixture I found that about 50 parts of mackerel and 50 parts of scallops form a mixture which jellies.

Seasoning may be added to produce any desired or appropriate taste. The seasoned and jelly-like mass of fish containing practically all of the drippage is packed into suitable aluminum molds having any desired shape.

The fish is baked at a temperature from about 100° C. to about 150° C. Following baking, the fish is smoked as in Example No. 1. The smoked seafood steak is ready for consumption or for wrapping and handling as an article of commerce.

It will thus be observed that the present invention provides a simple, practical and thoroughly satisfactory method for treating seafood and converting the same into a merchantable and consumable article of commerce which contains the drippage which is ordinarily lost.

It will also be noted that the present invention provides a seafood steak which can be cut and sliced like sturgeon, which is palatable, and which may have any suitable shape.

Although I have mentioned certain specific fish and certain specific protein-containing substances, it will be understood that other fish or seafood can be employed and that other appropriate protein-containing material or material of marine origin having a relatively high content can be employed. In this connection, it is to be noted that the average protein content of fresh fish and seafood is only about 10%, whereas the protein content of the fish or seafood employed as the protein-containing material has a relatively high protein content as for example shrimp having a protein content of about 25%.

I claim:

1. The method of treating seafood which comprises converting fresh seafood in to a fillet condition, while preventing a substantial loss of drippage, incorporating sufficient material having a relatively high protein content in said fillet fish as to cause the latter to form a jelly-like mass, the aforesaid operations being conducted without water soaking, cooking, curing, salting, compressing or canning, then baking said jelly-like mass, and finally smoking the baked fish under the influence of heat to a stable, consumable and handleable seafood steak.

2. The process of treating seafood which comprises filleting fresh seafood, incorporating drippage or liquid produced in the foregoing operation with the fillet fish, seasoning said fish mixture to give a desired taste, adding sufficient material having a relatively high protein content to said fish mixture to cause the formation of a jelly-like mass, packing said jelly-like mass into a mold, the aforesaid operations being conducted without water soaking, cooking, curing, salting, compressing or canning, then baking the fish, and finally smoking said baked fish under the influence of heat to form a firm handleable and edible steak.

3. The method of treating seafood which comprises filleting fresh seafood while preventing the loss of liquid or drippage, mixing a material having a relatively high protein-content of marine origin in said mixture of seafood in sufficient amount to cause the latter to form a jelly-like mass, packing said jelly into a mold of suitable shape, the aforesaid operations being conducted without water soaking, cooking, curing, salting, compressing or canning, then baking said fish, and finally smoking said fish under the influence of heat to a handleable and sliceable unit.

4. The method of treating seafood which comprises filleting fresh seafood while preventing loss of drippage, adding sufficient material having a relatively high protein content including the white of an egg in said fillet seafood in amount sufficient to cause the latter to form a jelly-like mass with the drippage produced in the filleting operation, packing said jelly-like mass into molds of suitable shape, the aforesaid operations being conducted without water soaking, cooking, curing, salting, compressing or canning, then baking said fish, and finally smoking said baked steak under the influence of heat to form a merchantable, edible and sliceable steak.

5. An integral seafood steak capable of being handled as a rigid, merchantable and edible unit and capable of being sliced comprising a solid, heat-smoked, baked mass of jelly-like fish containing drippage and containing material having a relatively high protein content, said material being present in sufficient amount to cause the formation of said jelly-like mass.

6. An integral seafood steak capable of being handled as a rigid, merchantable and edible unit and capable of being sliced comprising a solid, heat-smoked, baked mass of fillet seafood containing drippage thereof and containing material having a relatively high protein content in amount to cause the formation of jelly-like mass.

7. An integral seafood steak capable of being handled as a rigid, merchantable and edible unit and capable of being sliced comprising a solid, heat-smoked, baked mass of fish containing drippage and containing sufficient material having a relatively high protein content including white of an egg to cause the formation of a jelly-like condition.

8. The process of treating seafood which comprises filleting fresh seafood, adding sufficient material having a relatively high protein content to said fillet fish to cause the formation of a jelly-like mass, the aforesaid operations being conducted without water-soaking, cooking, curing, salting, compressing or canning, then baking the fish, and finally smoking said baked fish under the influence of heat to form a firm, handleable edible steak.

9. An integral seafood steak, said seafood steak being capable of being handled as a rigid, merchantable and edible unit and of being capable of being sliced, comprising a solid, heat-smoked, baked mass of jelly-like fish mass material having a relatively high protein content, said material being present in sufficient amount to cause the formation of said jelly-like mass.

CHARLES H. SCHUH.